United States Patent
Serra

(10) Patent No.: US 6,678,063 B2
(45) Date of Patent: Jan. 13, 2004

(54) MEASURING DEVICE FOR REINFORCING STEEL RODS FOR CONCRETE

(75) Inventor: Emilio Serra, Barcelona (ES)

(73) Assignee: Zumbach Electronic AG, Orpund (CH)

( * ) Notice: Subject to any disclaimer, the term of this patent is extended or adjusted under 35 U.S.C. 154(b) by 0 days.

(21) Appl. No.: 09/873,405

(22) Filed: Jun. 5, 2001

(65) Prior Publication Data

US 2002/0005959 A1 Jan. 17, 2002

(30) Foreign Application Priority Data

Jun. 9, 2000 (EP) .............................. 00112438

(51) Int. Cl.$^7$ .......................... G01B 11/04; G01B 11/08
(52) U.S. Cl. ...................................................... 356/638
(58) Field of Search ............................ 356/638, 385, 356/386, 635, 640; 250/559.24

(56) References Cited

U.S. PATENT DOCUMENTS

| 3,765,774 A | * | 10/1973 | Petrohilos .............. 250/559.19 |
| 3,947,129 A | * | 3/1976 | Wiklund .................... 356/429 |
| 4,416,541 A | | 11/1983 | Studer |
| 4,847,509 A | * | 7/1989 | Millet et al. ........... 250/559.24 |
| 4,914,307 A | * | 4/1990 | Kanev ................... 250/559.12 |
| 5,350,899 A | * | 9/1994 | Ishikawa et al. ............ 219/494 |
| 5,448,362 A | * | 9/1995 | Perchak ................. 250/559.26 |

FOREIGN PATENT DOCUMENTS

| EP | 0 462 431 | 12/1991 |
| FR | 2 729 217 | 7/1996 |
| JP | 56 117107 | 9/1981 |
| JP | 07 218227 | 8/1995 |

* cited by examiner

Primary Examiner—Thien M. Le
Assistant Examiner—Lisa M. Caputo
(74) Attorney, Agent, or Firm—Venable LLP; Robert Kinberg

(57) ABSTRACT

The invention relates to a method and an arrangement for optically detecting the measurements, in particular the diameters, of a long object during or after its production, which object moves forward continuously at high speed in lengthwise direction. With this method, one light beam intersects with the object at a measuring location at a flat angle ($\alpha$) and a second light beam intersects with the object at the same measuring location at a flat angle ($\beta$) and the shadows formed in the process are detected. The light beams are offset relative to each other in the cross-sectional plane that extends perpendicular to the longitudinal axis of the object by a specific angle ($\gamma$), and the angle ($\alpha$) corresponds to the angle ($\beta$) and preferably measures 10 to 40°, in particular essentially 20°.

26 Claims, 2 Drawing Sheets

MEASURING DEVICE FOR REINFORCING STEEL RODS FOR CONCRETE

CROSS-REFERENCE TO RELATED APPLICATION

This application claims the priority of European Patent Application 00112438.7 Jun. 9, 2000, the subject matter of which is incorporated herein by reference.

BACKGROUND OF THE INVENTION

The present invention relates to a method for optically detecting the measurements, in particular the diameters, of a long object during the production or following the production, which object moves continuously and at high speed in lengthwise direction. In addition, the invention relates to an arrangement for realizing this method.

For the production of long objects, for example pipes, cables or the like, the accuracy to size and in particular the diameter of such products represents a critical quality control factor. As is known, the accuracy to size of these products must be monitored during the production by using corresponding measuring methods, so-to-speak in real time, and the production parameters adapted, if necessary, to avoid a high number of rejections and thus achieve a high economy for the production method.

Given the present state of the technology, non-contacting optical measuring methods are also used for this "real time" control. In order to monitor the diameters during the production of long products, these measuring methods preferably use the principle of "shadow measuring." With this principle, the shadow of a light beam intersecting with the object is detected as measuring value for the diameter.

With rotation-symmetrical or oval products, optical measuring methods using at least two light beams have prevailed. For these methods, a first light beam intersects with the object to be measured at a specific angle while a second light beam also strikes the object at a specific angle. Both light beams in turn are offset relative to each other by a specific angle. The shadows detected in the process as measured values are correlated in real time and compared to actual parameters.

With the methods known from prior art, the light beams preferably strike the product moving along at relatively high speed with relatively steep angles of inclination. This is not a problem with products such as insulated electric cables, extruded pipes or the like, which have a smooth or uniform peripheral surface because technologically the outer diameter is always measured via the shadow formation.

Measuring methods of this type, however, lead to faulty results for products that distinguish themselves through specific peripheral surface structures since the shadow formation does not necessarily correspond to the basic object diameter. Methods of this type therefore present problems, for example when producing concrete reinforcing steel rods. Concrete reinforcing steel rods have ridges or similar profiles on their peripheral surfaces, which do not extend over the complete peripheral surface, but in most cases are offset relative to each other on opposite sides of the rod and are arranged at specific angles of inclination.

If light beams used for the optical measuring strike concrete reinforcing steel rods of this type at relatively steep angles, different shadow values are obtained, depending on whether a ridge or a surface contour is hit.

The production of such long rods or other long products made of steel furthermore carries a certain potential for danger, which so far has prevented the use of such optical detection methods for detecting the diameter of these products during production.

The products, in particular concrete reinforcing steel rods, are rolled while red-hot in the steel rolling plant and at high speeds that can be in the range of 100–200 km/h. Owing to the high rolling speeds, it is absolutely necessary that guides be used for these objects while they are exposed.

SUMMARY OF THE INVENTION

To use the optical measuring methods known from prior art, however, the red-hot product must travel at least over a specific distance while exposed, so as to be accessible to the optical measuring device and its light beams for the purpose of obtaining a perfect measurement.

Owing to the fact that the moving red-hot object is easily deformed, the danger exists that when leaving the steel rolling plant the object is deformed in the exposed path section and therefore does not correctly meet a guiding device, located opposite the steel-rolling plant. Instead, it collides with this guide, so that several hundred meters of red-hot material can pile up within a few seconds, thereby resulting in danger to people and measuring devices in the immediately surrounding area.

Starting with these disadvantages, it is the object of the present invention to provide a method as well as an arrangement for realizing this method, which permit an optical detection of the measurements of long products moving at a very high speed, in particular red-hot concrete reinforcing steel rods with surface profiles, without having to reduce the present production speeds.

According to the invention, this object is solved with a method for optically detecting during the production or following the production the measurements of a long object moving continuously at high speed in lengthwise direction. The method comprises providing one light beam to intersect with the object at a first angle at a measuring location and for a second light beam to intersect with the object at a second angle at the same measuring location and detecting the shadows formed in the process. The light beams are offset relative to each other in a cross-sectional plane that is perpendicular to the longitudinal axis of the object by a third angle. The first and second angles are flat angles and the first angle corresponds at least approximately to the second angle.

Surface profiles such as ridges on the concrete reinforcing steel rods can mostly be ignored because the invention provides that the light beams no longer strike the object with a steep angle at the measuring location, but intersect with the object at a flat angle, preferably 10 to 40° C. and in particular essentially 20°. Thus, when using a method of this type, the diameter values are no longer distorted by the ridge structure. Of course, the angles of incidence for the light beams can vary, depending on the different surface designs or profiles, so that their effect on the shadow formation can be compensated accordingly.

For one preferred embodiment, these light beams rotate around the longitudinal axis of the moving object, such that they perform a gyroscope movement, wherein a fixed point or reference point for this gyroscope movement is at the measuring location.

The gyroscope movement of another preferred embodiment is limited, such that the light beams oscillate back and forth by a specific angle.

In both embodiments, the complete peripheral surface or oval shape of the object is measured in this way, wherein the corresponding measured values for the shadows of both light beams are always correlated to each other.

Laterally deflected light beams, preferably laser beams, are used for this.

The invention provides for an arrangement to realize this method, in which the moving red-hot object is guided inside a protective device, arranged between the light sources on the one side and the corresponding receivers on the opposite side of the complete optical measuring device. The measuring location is located inside the protective device. For this, the protective device is provided with a first and a second slot that extend completely through the protective device.

The slots extend through the protective device at angles that match the angles of incidence for the light beams, so that these can pass through the slots without being refracted and can intersect the object inside the protective device at the measuring location. In the same way as the light beams, the slots in the protective device are aligned relative to each other by a corresponding angle in the projection plane that is perpendicular to the longitudinal axis of the moving object.

The protective device for one preferred embodiment is positioned inside a holder, such that it can rotate around the longitudinal axis of the object passing through. Thus, it can perform the respective procedural steps synchronously and together with the optical measuring device, which is also positioned so as to rotate.

BRIEF DESCRIPTION OF THE DRAWINGS

The invention is explained in further detail in the following with the aid of an exemplary embodiment, wherein the drawing shows the following.

DETAILED DESCRIPTION OF THE INVENTION

Figure 1:
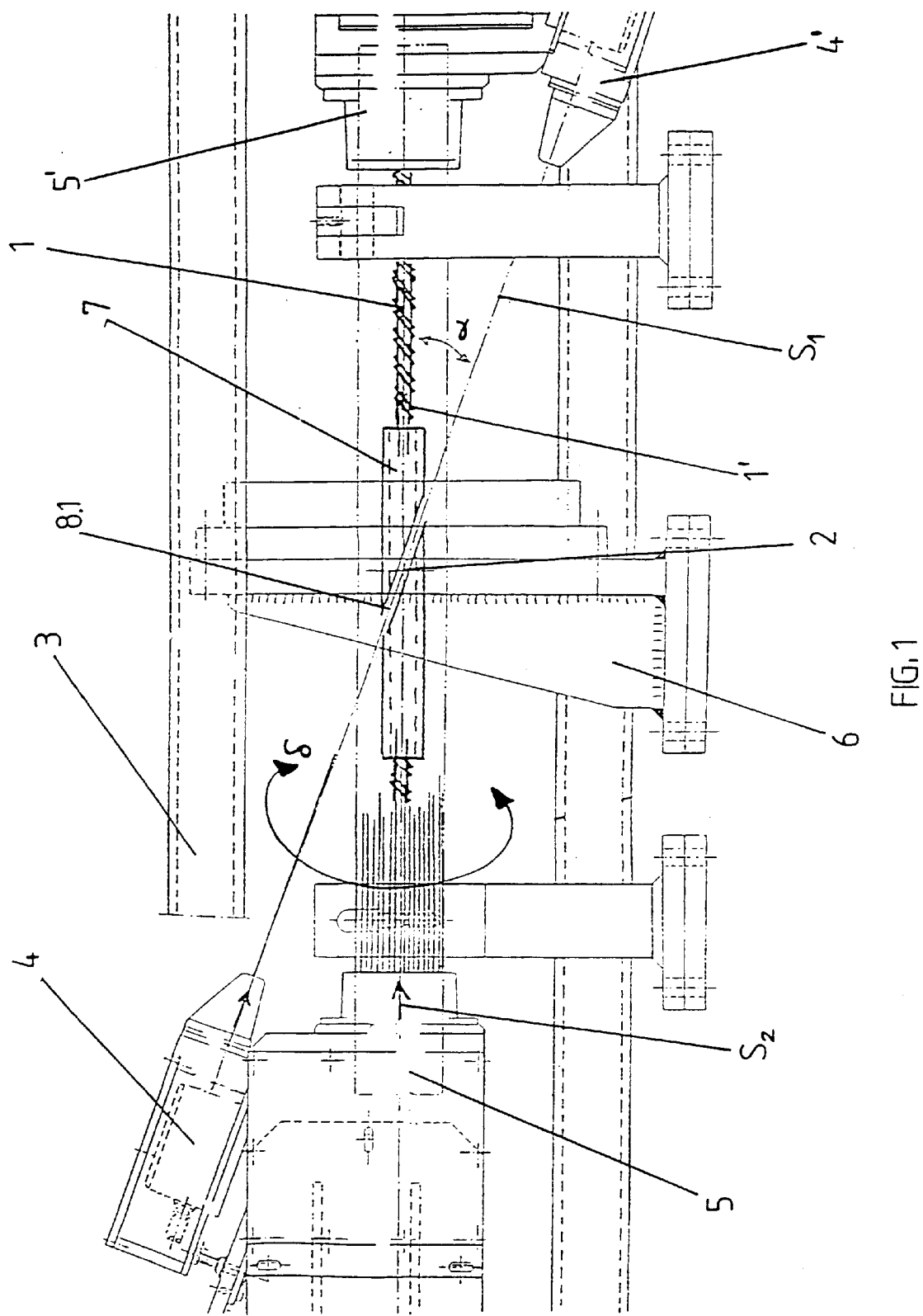
FIG. 1 A schematic representation of the arrangement for realizing the method according to the invention.

FIG. 1 shows the arrangement according to the invention, arranged at the output of a steel rolling plant that is not shown in further detail herein.

In FIG. 1, the arrangement comprises a frame 3 through which the object in the form of a concrete reinforcing steel rod 1, provided with ridges 1' across its periphery, passes from the right to the left at high speed and while still red-hot. In the process, the concrete reinforcing steel rod 1 is guided by a protective device 7, which in turn is positioned such that it can rotate inside a holder 6 of frame 3.

The frame 3 is provided with an optical measuring device in the form of two laser scanners. In FIG. 1, two transmitters 4 and 5 are arranged to the left of the protective device 7 on the frame 3 while corresponding receivers 4' and 5' are positioned on the opposite side, to the right of protective device 7, in a direct extension of the respective beam paths.

The laser beams S1 and S2 emitted by the transmitter 4 and 5 intersect the concrete reinforcing steel rod 1 at a measuring location 2 inside the protective device 7. The shadows 9 or 9' in FIG. 2, which are created in the process, are detected by the receivers 4' and 5' of the two laser scanners.

Figure 2:
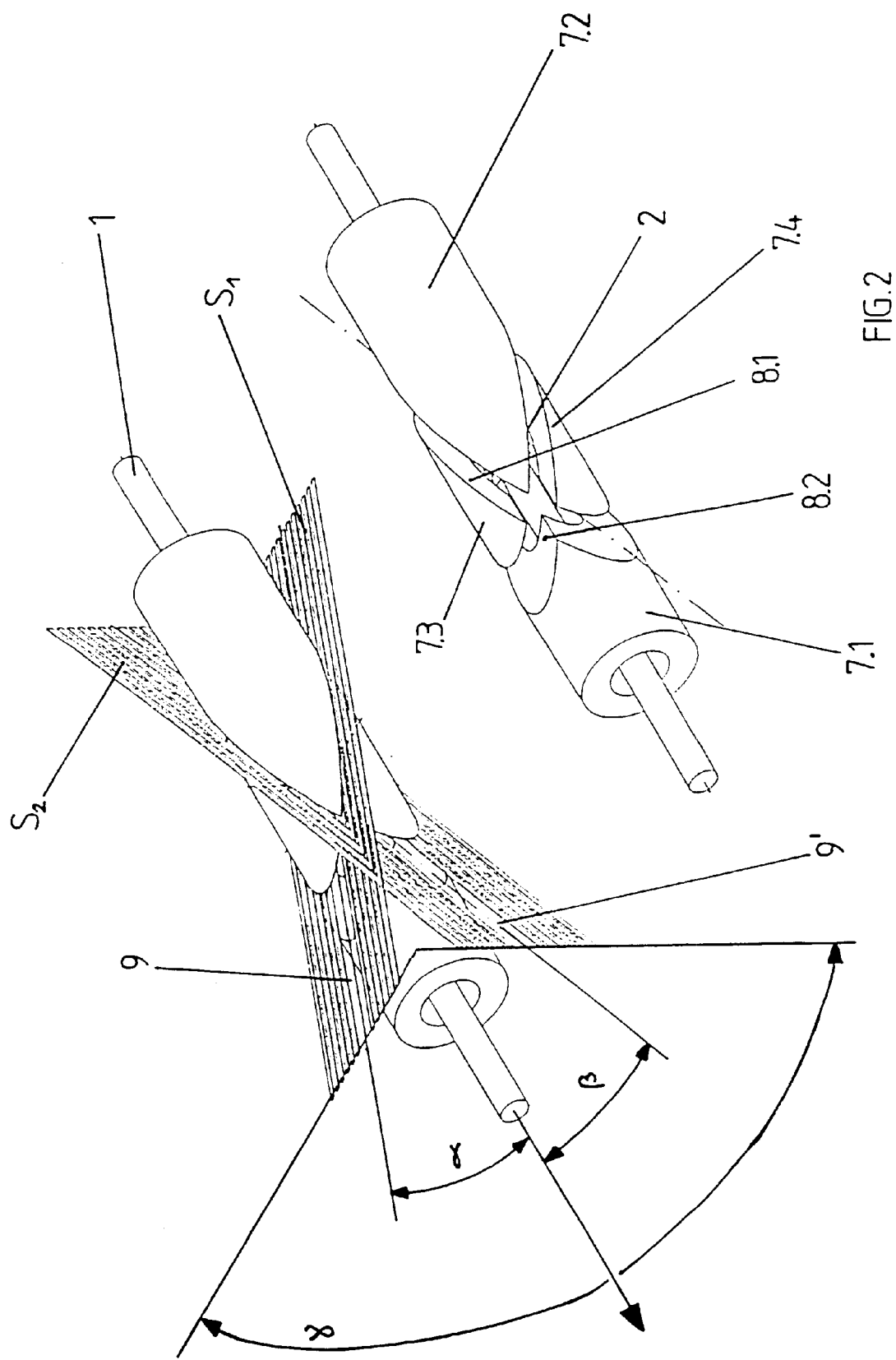
FIG. 2 A schematic representation of two views of the protective device, with and without a crossing light beam.

The protective device 7 is provided with corresponding slots 8.1 and 8.2 for this purpose. FIG. 2 clearly shows that the protective device 7 is divided into four separate sectional parts 7.1, 7.2, 7.3 and 7.4 by the arrangement of the slots 8.1 and 8.2. The four sectional parts are positioned relative to each other inside the holder 6.

The slots 8.1 and 8.2 extend through the protective device 7, respectively at angles $\alpha$ and $\beta$, which consequently correspond to the angles of incidence or the intersecting angles for the laser beams S1 and S2, so that these can pass through. The slots 8.1 and 8.2 still are wide enough to permit the non-refracting passage of laser beams S1 and S2, as well as to prevent the concrete reinforcing steel rod 1, guided inside the protective device 7, from colliding with the slots 8.1 and 8.2.

The upper view in FIG. 2 shows that the slots 8.1 and 8.2 as well as the laser beams S1 and S2 passing through these slots are offset by an angle $\gamma$, in this case measuring 90°, in the cross-sectional plane, which extends perpendicular to the longitudinal axis of the concrete reinforcing steel rod 1.

The optical measuring device, comprising transmitters 4 and 5 and receivers 4' and 5' of the laser scanners, as well as the protective device 7 with the fixed sectional parts 7.1, 7.2, 7.3 and 7.4 are positioned so as to rotate inside the frame 3, so that they can perform a synchronous rotary or rotary pendulum movement.

FIG. 1 shows that the rotary pendulum movement occurs around an angle $\delta$, so that the laser beams S1 and S2 can perform a limited gyrating movement around a fixed point at measuring location 2, meaning the point where the laser beams S1 and S2 intersect with the longitudinal axis of the concrete reinforcing steel rod 1.

With two laser beams S1 and S2 that are offset by 90°, an angle of $\delta+/-90°$ is sufficient to cover the complete peripheral surface of 360° of the concrete reinforcing steel rod 1.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention

What is claimed is:

1. A method for optically detecting measurements of a long object moving continuously at high speed in a lengthwise direction, the method comprising:

providing a first light beam to intersect the object at a first angle at a measuring location;

providing a second light beam to intersect the object at a second angle at the same measuring location, the first and second light beams forming shadows by intersecting the object; and detecting the shadows to determine the measurements, wherein the light beams are offset relative to each other by a third angle in a cross-sectional plane that is perpendicular to the longitudinal axis of the object;

wherein the angles first and second angles are flat angles and are approximately equal to one another.

2. The method of claim 1, wherein each of the first and second angles measures about 10° to 40°.

3. The method of claim 2, wherein each of the first and second angles measures approximately 20°.

4. The method of claim 1, wherein the light beams gyrate around the longitudinal axis of the object, through a fixed point at the measuring location by oscillating back and forth.

5. The method of claim 1, wherein the third angle measures approximately 90°.

6. The method of claim 1, wherein the light beams are laser beams and the object is a profiled concrete reinforcing steel rod.

7. The method of claim 1, further comprising calculating the diameter of the object from the detected shadows.

8. The method of claim 1, wherein the light beams gyrate around the longitudinal axis of the object, through a fixed point at the measuring location by oscillating back and forth by the third angle measuring about +/−90°.

9. The method of claim 1, wherein the first light beam and the second light beam are not substantially coplanar.

10. The method of claim 1, wherein the first light beam is provided by a first light source and the second light beam is provided by a second light source, the method further comprising providing a protective device between the first and second light sources and the object.

11. The method of claim 1, wherein the object has an uneven surface.

12. The method of claim 1, wherein the object is a red hot steel rod.

13. The method of claim 12, wherein the red hot steel rod is at a temperature of about 1000° C.

14. An arrangement comprising:
   a frame through which a long object moves at high speed substantially in a lengthwise direction;
   an optical measuring device comprising;
      a first light source and a first oppositely arranged receiver, the first light source providing a first light beam to intersect the object at a first angle at a measuring location; and
      a second light source with a second oppositely arranged receiver, the second light source providing a second light beam to intersect the object at a second angle at the measuring location, wherein the first and second angles are flat angles; and
      wherein the light sources and the receivers are arranged on the frame such that the beams are offset relative to each other by a third angle; and
   a protective device in which the moving object is guided between the light sources and the receivers.

15. The arrangement of claim 14, wherein the protective device is provided with a first slot arranged at the first angle and a second slot arranged at the second angle to allow the respective light beams to pass, wherein the slots intersect at the third angle and form the measuring location, and wherein the first angle is approximately equal to the second angle.

16. The arrangement of claim 15, wherein the first and second angles measure about 10° to about 40°.

17. The arrangement of claim 15, wherein the light beams gyrate around the longitudinal axis of the object, through a fixed point at the measuring location by oscillating back and forth.

18. The arrangement of claim 15, wherein the light beams gyrate around the longitudinal axis of the object, through a fixed point at the measuring location by oscillating back and forth by the third angle measuring about +/−90°.

19. The arrangement of claim 14, wherein the frame has a holder, the protective device being positioned in the holder, and the protective device and the optical measuring device being arranged to rotate about the longitudinal axis of the object and comprising at least one of a joint drive mechanism and separate, synchronously controlled drive mechanisms.

20. The arrangement of claim 14, wherein the light sources and the receivers are laser scanner.

21. The arrangement of claim 14, wherein the frame is adapted for arrangement at an outlet for a steel rolling plant.

22. The arrangement of claim 14, wherein the first light beam and the second light beam are not substantially coplanar.

23. The arrangement of claim 14, wherein the protective device is arranged between the first and second light sources and the object.

24. The arrangement of claim 14, wherein the object has an uneven surface.

25. The arrangement of claim 14, wherein the object is a red hot steel rod.

26. The arrangement of claim 25, wherein the red hot steel rod is at a temperature of about 1000°.

* * * * *